United States Patent
Thomas et al.

(10) Patent No.: US 7,079,838 B2
(45) Date of Patent: Jul. 18, 2006

(54) COMMUNICATION SYSTEM, USER EQUIPMENT AND METHOD OF PERFORMING A CONFERENCE CALL THEREOF

(75) Inventors: Howard Thomas, Swindon (GB); Gerry Foster, Swindon (GB)

(73) Assignee: Motorola, Inc., Schaumburg, IL (US)

( * ) Notice: Subject to any disclaimer, the term of this patent is extended or adjusted under 35 U.S.C. 154(b) by 103 days.

(21) Appl. No.: 10/492,107

(22) PCT Filed: Oct. 21, 2002

(86) PCT No.: PCT/EP02/11768

§ 371 (c)(1),
(2), (4) Date: Apr. 8, 2004

(87) PCT Pub. No.: WO03/039069

PCT Pub. Date: May 8, 2003

(65) Prior Publication Data
US 2005/0124328 A1   Jun. 9, 2005

(30) Foreign Application Priority Data
Nov. 2, 2001   (GB) ................................ 0126349.0

(51) Int. Cl.
*H04M 3/42* (2006.01)

(52) U.S. Cl. ............ 455/416; 455/518; 455/570; 455/422; 455/426

(58) Field of Classification Search ......... 455/416, 455/518, 570, 422, 426, 435
See application file for complete search history.

(56) References Cited

U.S. PATENT DOCUMENTS

| | | | | |
|---|---|---|---|---|
| 5,612,955 A | * | 3/1997 | Fernandes et al. | 370/433 |
| 5,991,716 A | * | 11/1999 | Lehtimaki | 704/212 |
| 5,995,827 A | * | 11/1999 | Gitlin et al. | 455/416 |
| 6,055,497 A | | 4/2000 | Hallkvist et al. | |
| 2003/0063573 A1 | * | 4/2003 | Vandermersch | 370/260 |
| 2003/0091182 A1 | * | 5/2003 | Marchok et al. | 379/392.01 |

(Continued)

OTHER PUBLICATIONS

Benyassine A et al.: "Itu-T Recommendation G. 729 Annex B: A Silence Compression Scheme for use with G.729 Optimized for V.70 Digital Simultaneous Voice and Data Applications", IEEE Communications Magazine, IEEE Service Center. Piscataway, N.J., US., vol. 35, No. 9. Sep. 1, 1997, pp. 64-73.

(Continued)

*Primary Examiner*—Matthew Anderson
*Assistant Examiner*—Tuan Pham
(74) *Attorney, Agent, or Firm*—Jeffrey K. Jacobs; Brian M. Mancini

(57) ABSTRACT

This invention relates to a communication system (200), user equipment (201,211) and method of performing a conference call. The communication system (200) employs discontinuous transmission and has a plurality of user equipment (201, 211, 213, 215) and a fixed network (205, 207, 208). It further comprises a speech metric processor (225) for determining if speech is originating at the user equipment. The system also comprises a silence descriptor frame generator (229) which generate silence descriptor frames if no speech is originating and a conference call processor (231) for determining if a call involving the user equipment is a conference call. Furthermore the communication system comprises means (229, 239) for suppressing silence descriptor information of the silence descriptor frames if the call is a conference call. The invention is applicable to cellular mobile radio communication systems such as UMTS.

14 Claims, 2 Drawing Sheets

U.S. PATENT DOCUMENTS

2003/0125910 A1* 7/2003 Randmaa et al. ............ 702/191

OTHER PUBLICATIONS

Beritelli F et al.: "new speech processing issues in IP telephony", Communication Technology Proceedings, 2000. WCC-ICCT 2000. International.

Claypool M et al.: "Silence is Golden?-The Effects of Silence Deletion on the CPU Load of an Audio Conference", Proceedings of the International Conference on Multimedia Computing and Systems, Los Alamitos, CA, US Apr. 15, 1994, pp. 9-18.

Li Y et al.: "Multipoint Conferencing for Mobile Communications Network" International Conference on Universal Personal Communications, IEEE, New York, NY, US, vol. 1, 1993, pp. 212-216.

* cited by examiner

COMMUNICATION SYSTEM, USER EQUIPMENT AND METHOD OF PERFORMING A CONFERENCE CALL THEREOF

FIELD OF THE INVENTION

This invention relates to a communication system, user equipment and method of performing a conference call therefor.

BACKGROUND OF THE INVENTION

In a cellular communication system, each of the subscriber units (typically mobile stations) communicates with typically a fixed base station. Communication from the subscriber unit to the base station is known as uplink and communication from the base station to the subscriber unit is known as downlink. The total coverage area of the system is divided into a number of separate cells, each predominantly covered by a single base station. The cells are typically geographically distinct with an overlapping coverage area with neighbouring cells. FIG. 1 illustrates a cellular communication system 100. In the system, a base station 101 communicates with a number of subscriber units 103 over radio channels 105. In the cellular system, the base station 101 covers users within a certain geographical area 107, whereas other base stations 113, 115 cover other geographical areas 109, 111. Some overlap areas 117 can be covered by more than one cell.

As a subscriber unit moves from the coverage area of one cell to the coverage area of another cell, the communication link will change from being between the subscriber unit and the base station of the first cell, to being between the subscriber unit and the base station of the second cell. This is known as a handover. Specifically, some cells may lie completely within the coverage of other larger cells.

All base stations are interconnected by a network. This network comprises communication lines, switches, interfaces to other communication networks and various controllers required for operating the network. The base stations themselves can also be considered part of the network. A call from a subscriber unit is routed through the network to the destination specific for this call. If the call is between two subscriber units of the same communication system the call will be routed through the network to the base station of the cell in which the other subscriber unit currently is. A connection is thus established between the two serving cells through the network. Alternatively, if the call is between a subscriber unit and a telephone connected to the Public Switched Telephone Network (PSTN) the call is routed from the serving base station to the interface between the cellular mobile communication system and the PSTN. It is then routed from the interface to the telephone by the PSTN.

Known cellular communication systems such as GSM uses discontinuous transmission whereby the transmissions from and to a base station is reduced when there is no voice activity on the link, for example during pauses in natural speech or when the other party is speaking. This significantly reduces the total power transmitted and thus reduces battery power drain and the interference caused to other subscriber units.

Conference calls are widely used in conventional landline telephony and are also becoming an increasingly popular way of conducting meetings using mobile telephony.

In a conference call, parties to the call may be calling from many different environments, some of which may have a high back ground noise level (a particular case is a mobile call from a moving car).

Discontinuous transmission (known as DTX for GSM) is in GSM implemented by first detecting that speech is not being transmitted then transmitting a silence descriptor frame at intervals of about 9 speech frames. Silence descriptor frames are widely used in cellular communication systems employing discontinuous transmission and contain information related to the background noise in the absence of voice activity. This enables the voice decoder to generate background noise corresponding to the background noise of the originating subscriber unit. This is very useful in two way communication, as the other party by hearing the background noise of the remote subscriber unit is aware that the link is still established and that the call has not been dropped. However, although DTX reduces the power transmitted, it also performs the function of simulating a high level of background noise at the far end of the link. This is disadvantageous in a conference call as the total background noise from all participants may significantly reduce the perceived quality. Thus, within a conference call DTX does not help the perceived quality of the multi party call.

Conference bridges typically operate a function to mute to some extent calling parties that are not active on the basis of sound volume. Typically, such a conference bridge is operated as part of the PSTN and as the sound volume of the background noise (especially from a mobile station) may be quite significant, the background noise may not be muted and the active speech signal generated may be disturbed by the background noise from the non-active participants.

Hence, there is a need for an improved method and system for performing conference calls in a communication system employing discontinuous transmission.

SUMMARY OF THE INVENTION

The inventors of the current invention have realised that conventional approaches for performing a conference call in a communication system employing discontinuous transmission are suboptimal and can be improved. The invention seeks to provide an improved method and system for performing conference calls in a communication system employing discontinuous transmission.

Accordingly there is provided a method of performing a conference call in a communication system employing discontinuous transmission and having a plurality of user equipment and a fixed network, the method comprising the steps of: determining if speech is originating at a first user equipment of said plurality of user equipment; generating silence descriptor frames if no speech is originating at the first user equipment; determining if a call involving the first user equipment is a conference call; and suppressing silence descriptor information of the silence descriptor frames if the call is a conference call.

In contrast to a conventional call where omission of background noise is very disturbing and unpleasant to the user, the method thus significantly improves quality for conference calls by significantly reducing noise.

Preferably the suppression of the silence descriptor information is by setting the silence descriptor information of the silence descriptor substantially similar to that indicating silence and the step of determining if speech is originating at a first user equipment is performed by comparing the characteristics of a signal originating at the first user equipment to characteristics typical of a speech signal.

According to one feature of the invention, the communication system is a cellular communication system wherein the user equipment communicates through radio signals with at least one base station of the network.

In accordance with a second aspect of the invention, there is provided a communication system employing discontinuous transmission and having a plurality of user equipment and a fixed network, the communication system comprising: means for determining if speech is originating at a first user equipment of said plurality of user equipment; means for generating silence descriptor frames if no speech is originating at the first user equipment; means for determining if a call involving the first user equipment is a conference call; and means for suppressing silence descriptor information of the silence descriptor frames if the call is a conference call.

In accordance with a third aspect of the invention, there is provided a user equipment employing discontinuous transmission and comprising: means for determining if speech is originating at the user equipment; means for generating silence descriptor frames if no speech is originating at the user equipment; means for determining if a call involving the first user equipment is a conference call; and means for suppressing silence descriptor information of the silence descriptor frames if the call is a conference call.

BRIEF DESCRIPTION OF THE DRAWINGS

An embodiment of the present invention is described below, by way of example only, with reference to the Drawings, in which.

DETAILED DESCRIPTION OF A PREFERRED EMBODIMENT

The following description focuses on an embodiment compliant with a cellular communication system, such as GSM or UMTS (Universal Mobile Telecommunication System), but it will be apparent that the invention is not limited to this application.

Figure 2:
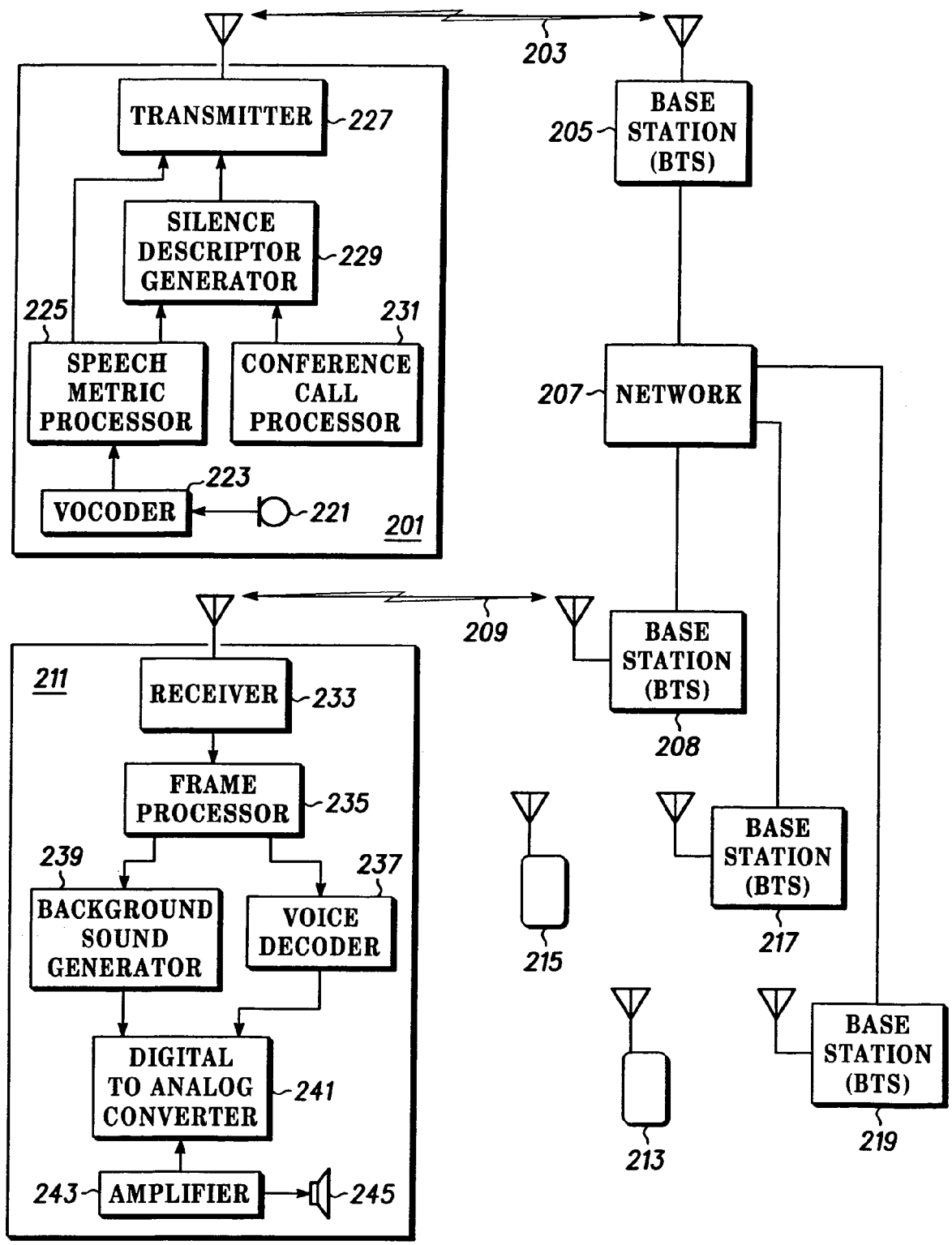
FIG. 2 is an illustration of a communication system in accordance with an embodiment of the invention.

FIG. 2 illustrates a communication system 200 in accordance with an embodiment of the invention.

A transmitting user equipment (UE) 201 (such as typically e.g. a user terminal, subscriber unit, mobile station or any other suitable device) communicates over a radio link 203 with a base station 205. The base station 205 is connected to an interconnecting fixed network 207. The network 207 comprises base station controllers, master switch centres, radio network controllers, operations and maintenance centres and any other network components required for implementing a desired network configuration as is well known in the art. The network 207 is further connected to a second base station 209 which over a radio link 209 communicates with a receiving UE 211. FIG. 2 also shows further transmitting UEs 213 and 215 communicating with the network through base stations 217, 219.

For clarity the UEs have been shown as transmitting or receiving UEs but it is clear that typically a UE will comprise functionality for both transmitting and receiving and will be both a transmitting and receiving UE. Specifically, the UE may function as a transmitting UE when there is voice activity by the user and a receiving UE when there is no voice activity, or it may simultaneously function as both a transmitting and receiving UE.

The transmitting UE 201 is communicating with the base station 205 using discontinuous transmission. Discontinuous transmission includes any transmission protocol, which modifies the transmission format depending on the data transmission requirements of the UE and in a particular depending on the voice activity. In one form of discontinuous transmission the information data rate varies in response to the user activity of the UE. In the specific embodiment, the discontinuous transmission between the UE and the base station employs silence descriptor frames (SID frames). When the UE 203 detects voice activity it transmits voice data at a first rate. When no activity is detected it transmits SID frames at a much lower rate. In the specific GSM embodiment one SID frames is transmitted for every 9 speech frames and thus the effective data rate for SID frames is 9 times lower than for speech frames resulting in less power being transmitted and thus resulting in a lower power drain and reduced interference caused to other UEs.

A frame in a communications system has a similar function to an envelope in a postal system; it provides a container to carry information. Typically a communication system will support a number frames with different functions, for example, some may be designed to carry user data between users, whilst others may be designed to carry signalling information. Therefore, a frame comprises a variable number of elements that may include; a source and a destination address, a description of the contents of the frame (eg its type, length etc), a data payload that may be user data or signalling data, data used to detect and correct errors introduced by the channel.

In the context of this embodiment, we are concerned with the generation and transmission of speech frames, and when the speech codec determines speech is not present, of silence descriptor frames, The SID frames comprise silence descriptor information. This is information generated in response to the background noise detected by the UE. In GSM the silence descriptor information is not intended to allow accurate reproduction at the receiving UE but only to generate some background noise which is related to the background noise at the transmitting UE. In its simplest form the silence descriptor information may simply consist in an indication of the relative volume level of the background noise, and in more advanced embodiments it may comprise further information such as frequency response of the noise etc. The nature of the information in the SID frame is determined by the voice coding-decoding algorithm (Codec) used in the communication system. For example, the GSM codec transmits a number of parameters that define the shape of a filter characteristic and a number of parameters that describe the excitation to that filter; the silence descriptor in this case will thus contain a filter parameter set and excitation that models the back ground noise in the vicinity of the transmitting user.

Further description of SID frames in a GSM environment can be found in "The GSM System of Mobile Communications" by Mouly and Pautet, Cell & Sys, 1992, ISBN 2-9507190-0-7.

The transmitting UE 201 comprises a microphone 221 for converting the voice of the user to an electrical signal. This signal is fed to a vocoder 223, which digitises the signal, and codes in accordance with a vocoding technique as is well known in the art. The vocoder is connected to a speech metric processor 225, which is operable to determine if the digitised signal from the vocoder corresponds to a speech signal or to a representation of background noise. The speech metric processor 225 is connected to the transmitter for transmission of speech frames if voice activity is detected, or to a silence descriptor generator 229 for generation of a SID frame if no voice activity is detected. The silence descriptor generator 229 is connected to the transmitter 227 for transmission of the SID frame. A conference call processor 23,1 operable to detect if the UE is in a conference call, is connected to the silence descriptor generator 229.

Figure 1:
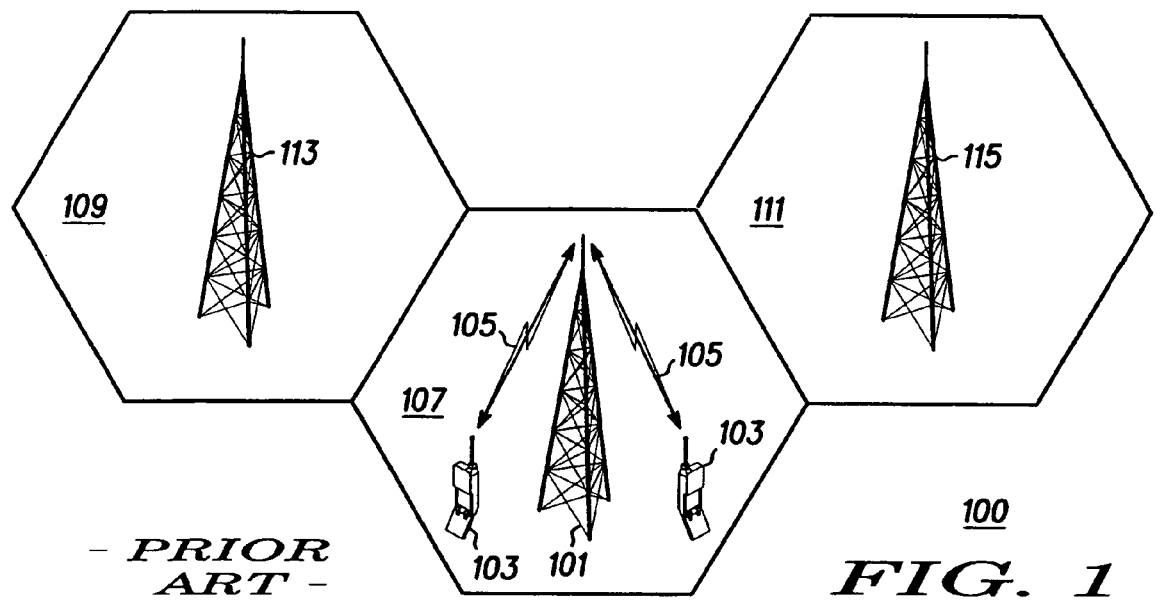
FIG. 1 is an illustration of a cellular communication system according to prior art.
Figure 3:
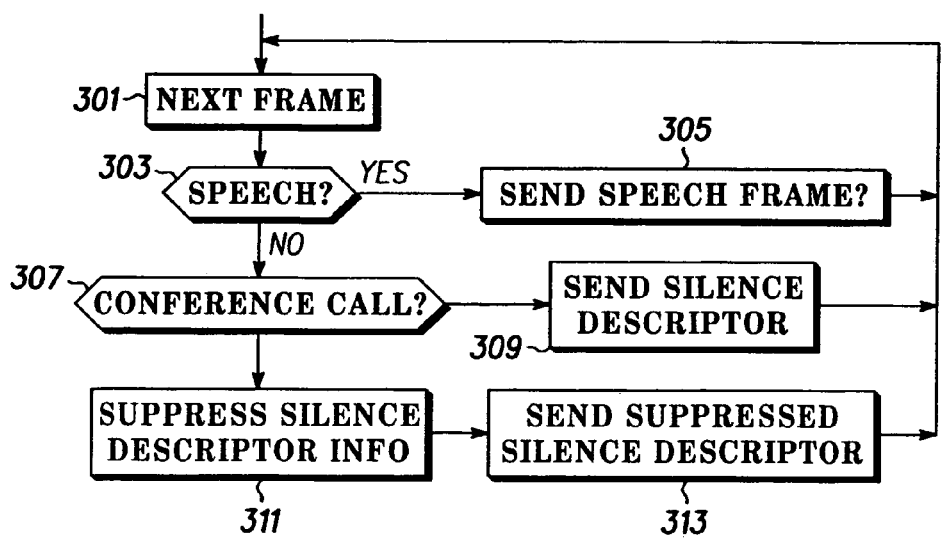
FIG. 3 illustrates a flow chart of a method of performing a conference call in accordance with an embodiment of the invention.

FIG. 3 illustrates the flow chart of a method 300 of performing a conference call in the UE in accordance with this embodiment of the invention.

In step 301 the next frame is processed, meaning that the vocoder processes a segment of the speech signal and generates a vocoded data packet corresponding to that segment or interval. In GSM the vocoder processes 20 msec speech segments. In step 303 the generated speech frame is evaluated to determine if it corresponds to a speech signal or whether it corresponds to background noise. In the preferred embodiment step 303 is carried out in the speech metric processor 225 and operates by comparing the characteristics of digitised signal in the transmitting UE to characteristics typical of a speech signal. The speech metric processor 225 may specifically examine the speech coder metrics to determine if a transmitted frame is probably speech or not. Such function might be performed by determining the vector space that the vocoder metric spans with speech, then rejecting frames with metrics outside that boundary (this function might be enhanced by a user training her phone). Such function might also be performed by a speech recognition function, especially given that such recognition functions are already existent in phones today.

If the speech metric processor 225 determines that the frame corresponds to speech, the method continues in step 305 by the speech frame being fed to the transmitter 227 for transmission in accordance with the transmission protocol of the communication system.

If it is determined that the frame does not correspond to speech this information is fed to the silence descriptor generator 229.

The conference call processor 231 executes step 307 and determines if the UE is taking part in a conference call or not. This determination may be based on for example information received from the network indicating that the call is a conference call, by the UE automatically determining so based on the call id (e.g. certain phone numbers may be pre-designated as conference call numbers) or by automatic detection in the UE of received speech from a plurality of voices. However, in the preferred embodiment it is simply done by the user indicating to the UE that the current call is a conference call, for example by pressing a button on the exterior of the UE. The information as to whether the call is a conference call is fed to the silence descriptor generator 229.

If the call is not a conference call the silence descriptor generator proceeds in step 309 by transmitting the SD frame in accordance with the transmission protocol of the communication system.

If the call is a conference call, the silence descriptor generator proceeds in step 311 by suppressing the silence descriptor information in the SID frame. This may for example be done by modifying the SID frame already generated or generating a new SID frame containing the suppressed information. In the preferred embodiment, the suppression is performed by setting the silence descriptor information of the SID frame to that which is equivalent to complete silence. In other words, a zero SID frame is generated either by generation of a new SID frame or by replacing the information content of an existing SID frame.

The method then continues in step 313 by the transmission of the suppressed SD frame using the standard transmission protocol for SID frames.

After transmission of a frame, the UE continues by processing the next segment or interval of the signal as long as the call continues.

The transmitted frames are received by the base station 205 and through the network 207 and other base station 208 transmitted to the receiving UE 211. The receiving UE may also receive transmissions on other channels (e.g. other timeslots for GSM) from other UEs 213,215 taking part in the conference call. The receiving UE will combine these signals into a single audio signal. In its simplest form the UE processes all received signals independently and only combines them at the input to the analogue amplifier which may be a summing amplifier.

In this embodiment, the receiving UE 211 comprises a receiver for receiving the radio signals and generating the underlying data. The receiver is connected to a frame processor 235 which derives and analyses the current data frame. The frame processor 235 is connected to a background sound generator 239 and a voice decoder 237. If the frame processor 235 detects that the received frame is a speech frame, it feeds the signal to the voice decoder 237 that converts the signal into a digital signal which is converted to an analogue signal by the Digital to Analog Converter 241. The output of the Digital to Analog Converter 241 is connected to an analogue amplifier which is connected to a loudspeaker 245 for generating an audio signal for the user of the receiving UE.

If the frame processor 235 detects that the received frame is a silence descriptor frame, it feeds the signal to the background noise generator that generates a background noise signal which is fed to the Digital to Analog Converter 241 instead of the speech signal.

A very simple form of combining the signals of the different transmitting UEs is to process the frames received from the transmitting parties independently and in parallel and to add the resulting signals at the input to the analogue amplifier. In this embodiment the UE either employs a plurality of parallel components or the individual components are operable to independently process more than one signal. In this case the method of receiving as described in the previous paragraphs is repeated for each transmitting UE in the conference call.

It is clear that if no suppression of background noise is included the background noise from the different UEs will add up and worsen the speech quality. Even if signals of low volume are muted a high level of background noise (as for example from a UE being used in a car) will still be allowed through causing a deterioration in the voice quality. However, by employing the described embodiment of the invention in the transmitting UE the background noise of a non-active UE is suppressed resulting in no contribution to the background noise at the receiving UE thereby improving the perceived speech quality.

In other embodiments, the suppression of the silence descriptor information is not done by modifying the information content of the silence descriptor frame but by ignoring the silence descriptor frame completely. In one such embodiment, the transmitting UE 201 simply transmits the SID frames irregardless of whether it is involved in a conference call or not. However, upon receiving the frames, the receiving UE determines if it is in a conference call and if so it simply suppresses the silence descriptor information by ignoring any SID frames received from any transmitting UE. In this embodiment the receiving UE may thus disconnect the background sound generator 239 when in a conference call and reconnect it when in a conference call.

In a different embodiment, the SID frames are ignored in the network for example by the SID frames not being routed to the destination.

In a different embodiment, the combination of the signals from transmitting UEs are not combined in the receiving UEs but in a conference application operable to form a conference bridge. This conference application will typically be implemented in the network or in a separate component connected to the network. In this embodiment, the signals from all transmitting UEs are communicated to the conference application and the resulting conference signal is distributed to all receiving UEs. Note that typically all transmitting UEs will also be receiving UEs and in order to avoid an echo effect the signal from a UE is not sent back to the same UE.

In this embodiment the conference application will simply combine all speech frames but will ignore all SID frames unless no speech frames are received, in which case one or more SID frames may be used for generating background noise or may be forwarded to the receiving UEs.

It is within the contemplation of the invention that the functions required for performing the conference call can be implemented anywhere suitable such as in the UEs, the network or the conference application or it can be distributed between these.

The determination if speech is originating at the transmitting UE may be determined in the transmitting UE or alternatively in the base stations, the network or the conference application in response to the speech frames received. For example, the conference application may comprise a speech metric processor which evaluates, if the received frame corresponds to speech or background noise. Similarly the generation of SID frames may be generated in the transmitting UE or alternatively in the base stations, the network or the conference application.

The suppression of the silence descriptor information may also be implemented anywhere in the system such as in the transmitting UE, the network, the conference application or the receiving UE. Specifically, in one embodiment the determination if speech is originating at the transmitting UE and the generation of SID frames is performed in the transmitting UE and the suppression of the silence descriptor information is performed in a conference application, which also inherently determines that the current call is a conference call as it forms the conference bridge. This embodiment has the advantage of being possible to implement centrally without modification to UEs already operable to use silence descriptor frames.

Alternatively, the transmitting UE may determine that the call is conference call and set a flag in the SID frame to indicate this. The silence descriptor information may be automatically suppressed (for example by modifying or ignoring the SID frame) anywhere in the system upon detection that this flag is set. This functionality could advantageously be implemented in the network including the base stations.

It is within the contemplation of the invention that any suitable form of determining if speech is originating at a transmitting UE may be used. In a very simple embodiment, it is simply detected whether any signal is picked up by the microphone of the receiving UE. If the signal level is below a threshold it is determined that no speech is originating and if above this threshold it is determined that speech is originating.

The components and functionality described may be implemented in any suitable manner to provide suitable apparatus. Specifically, the components may consist of a single discrete entity, or may alternatively be formed by adapting existing parts or components. As such the required adaptation may be implemented in the form of processor-implementable instructions stored on a storage medium, such as a floppy disk, hard disk, PROM, RAM or any combination of these or other storage media. Furthermore, the functionality may be implemented in the form of hardware, firmware, software, or any combination of these.

It will be understood that the invention tends to provide the following advantages singly or in any combination:

resulting audio noise is significantly reduced for conference calls.

normal operation of the UE is not affected as the modified behaviour only operates during a conference call. This is a significant advantage as the absence of comfort noise in a normal conversation is very unpleasant to users whereas it actually provides improved quality for a conference call.

reduction in the utilisation of the communication channel resources between the UE and the network arising from suppression of SID frame transmission which may also reduce the cost to the end user and/or network provider.

The invention claimed is:

1. A method of performing a conference call in a communication system employing discontinuous transmission and having a plurality of user equipment and a fixed network, the method comprising the steps of:
   determining if speech is originating at a first user equipment of said plurality of user equipment;
   generating silence descriptor frames if no speech is originating at the firs user equipment;
   determining if a call involving the first user equipment is a conference call; and
   suppressing silence descriptor information of the silence descriptor frames only if the call is a conference call, wherein the suppression of the silence descriptor information automatically allows all speech to be communicated whereas background noise is not communicated.

2. A method as claimed in claim 1 wherein the steps of determining if speech is originating in the first user equipment and the step of generating silence descriptor frames are performed in the first user equipment.

3. A method as claimed in claim 1 wherein and step of suppressing the silence descriptor information is performed in the user equipment.

4. A method as claimed in claim 1 wherein and step of suppressing the silence descriptor information is performed in the network.

5. A method as claimed in claim 1 wherein and step of suppressing the silence descriptor information is performed in a conference application operable to form a conference bridge.

6. A method as claimed in claim 1 wherein the step of determining if a call involving the first user equipment is a conference call is performed in the user equipment.

7. A method as claimed in claim 1 wherein the step of determining if a call involving the first user equipment is a conference call is performed in the network.

8. A method as claimed in claim 1 wherein the step of determining if a call involving the first user equipment is a conference call is performed in a conference application operable to form a conference bridge.

9. A method as claimed in claim 1 wherein suppression of the silence descriptor information is by setting the silence descriptor information of the silence descriptor substantially similar to that indicating silence.

10. A method as claimed in claim 1 wherein the step of determining if speech is originating at the first user equipment is performed by comparing the characteristics of a signal originating at the first user equipment to characteristics typical of a speech signal.

11. A method of performing a conference call as claimed in claim 1 wherein the communication system is a cellular communication system wherein the user equipment communicates through radio signals with at least one base station of the network.

12. A communication system employing discontinuous transmission and having a plurality of user equipment and a fixed network, the communication system comprising:
    means for determining if speech is originating at a first user equipment of said plurality of user equipment;
    means for generating silence descriptor frames if no speech is originating at the firs user equipment;
    means for determining if a call involving the first user equipment is a conference call; and
    means for suppressing silence descriptor information of the silence descriptor frames only if the call is a conference call, wherein the suppression of the silence descriptor information automatically allows all speech to be communicated whereas background noise is not communicated.

13. A communication system as claimed in claim 12 wherein the communication system is a cellular radio mobile communication system.

14. A user equipment employing discontinuous transmission comprising:
    means for determining if speech is originating at a first user equipment;
    means for generating silence descriptor frames if no speech is originating at the user equipment;
    means for determining if a call involving the first user equipment is a conference call; and
    means for suppressing silence descriptor information of the silence descriptor frames only if the call is a conference call, wherein the suppression of the silence descriptor information automatically allows all speech to be communicated whereas background noise is not communicated.

* * * * *